US012576543B2

(12) United States Patent
    Barnhart et al.

(10) Patent No.: US 12,576,543 B2
(45) Date of Patent: Mar. 17, 2026

(54) SOFT ROBOTICS, AUTONOMOUS, SPACE INSPECTION, CRAWLING ROBOT

(71) Applicant: UNIVERSITY OF SOUTHERN CALIFORNIA, Los Angeles, CA (US)

(72) Inventors: David A. Barnhart, Rolling Hills, CA (US); Serena Estrada, Los Angeles, CA (US); Marissa Renteria, Mountain View, CA (US); Christian Blair, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 84 days.

(21) Appl. No.: 17/993,172

(22) Filed: Nov. 23, 2022

(65) Prior Publication Data

US 2023/0158688 A1      May 25, 2023

Related U.S. Application Data

(60) Provisional application No. 63/282,934, filed on Nov. 24, 2021.

(51) Int. Cl.
    | | |
    |---|---|
    | *B25J 15/00* | (2006.01) |
    | *B25J 9/16* | (2006.01) |
    | *B25J 15/02* | (2006.01) |
    | *B25J 15/10* | (2006.01) |
    | *B25J 19/02* | (2006.01) |
    | *B64G 4/00* | (2006.01) |

(52) U.S. Cl.
    CPC ......... *B25J 15/0233* (2013.01); *B25J 9/1612* (2013.01); *B25J 9/1664* (2013.01); *B25J 15/008* (2013.01); *B25J 15/10* (2013.01);

*B25J 19/02* (2013.01); *B64G 4/00* (2013.01); *B64G 2004/005* (2013.01)

(58) Field of Classification Search
    CPC ....... F03G 7/06; B25G 4/00; B64G 2004/005; B25J 15/008; B25J 9/1085; B25J 9/0015; B25J 9/065
    See application file for complete search history.

(56) References Cited

U.S. PATENT DOCUMENTS

| | | | | |
|---|---|---|---|---|
| 9,222,493 B2 * | 12/2015 | Riskas | .................. | F15B 21/085 |
| 11,377,162 B2 * | 7/2022 | Ding | ........................ | F03G 7/065 |
| 11,661,217 B2 * | 5/2023 | Barnhart | ................ | B25J 9/0087 |
| | | | | 244/172.4 |
| 2021/0094709 A1 * | 4/2021 | Barnhart | .................. | B64G 4/00 |

FOREIGN PATENT DOCUMENTS

CN          107053155 A  *  8/2017

* cited by examiner

*Primary Examiner* — Gregory Robert Weber
(74) *Attorney, Agent, or Firm* — Brooks Kushman P.C.

(57)                    ABSTRACT

A multi-armed robotic translation device includes a robotic body that includes a base section and a cover section attached to the base section. A plurality of tentacles is attached to the robotic body. The plurality of tentacles are configured to apply a shear force on the target object to grip the target object using an adhesive force, each tentacle including at least one shape memory alloy wire configured to move the tentacle. A control system is positioned in the robotic body and is configured to provide power and/or control signals to the tentacles.

20 Claims, 11 Drawing Sheets

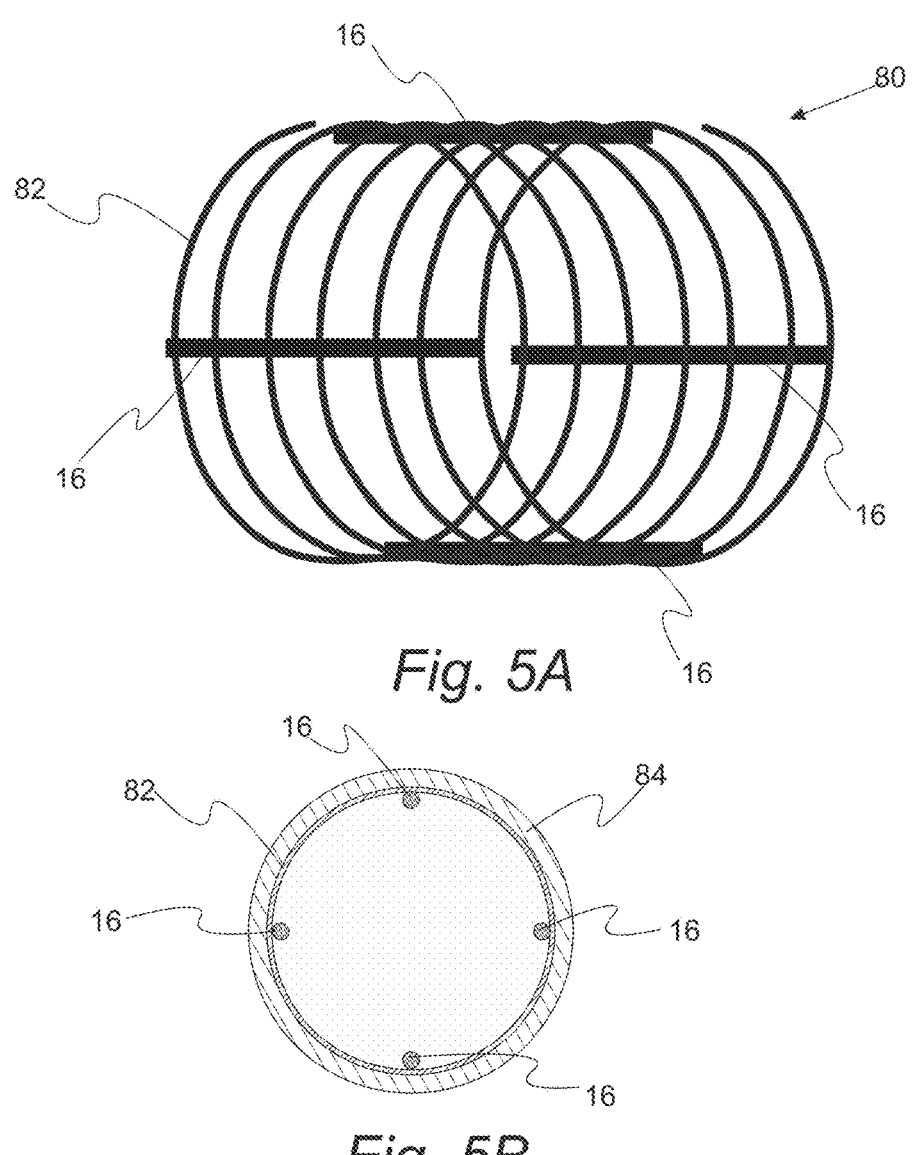
*Fig. 5A*
*Fig. 5B*
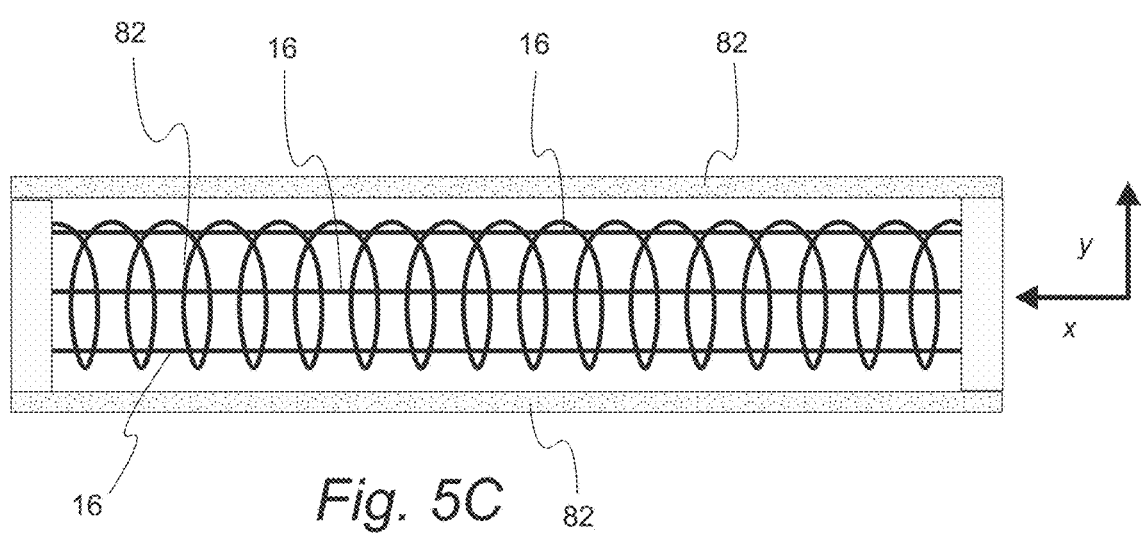
*Fig. 5C*

SOFT ROBOTICS, AUTONOMOUS, SPACE INSPECTION, CRAWLING ROBOT

CROSS-REFERENCE TO RELATED APPLICATIONS

This application claims the benefit of U.S. provisional application Ser. No. 63/282,934 filed Nov. 24, 2021, the disclosure of which is hereby incorporated in its entirety by reference herein.

TECHNICAL FIELD

In at least one aspect, the present invention relates to soft, autonomous robots.

BACKGROUND

As the advent of on-orbit servicing comes of age, the ability to build larger structures in Space, assemble, repair, and augment existing or new space platforms presents unique opportunities and challenges. One of the challenges is the validation and verification of an assembly process done solely in Space. Activities that connect, sinter, deposit materials, weld or fuse, etc., may require evaluation and validation of the process used on the space platform from the various servicing methods. The inspection of the resulting process in zero-g and vacuum of very large non-linear assemblies of various structural/electronic/manipulation elements can be done with free-floating stand-off devices, but these require independent rendezvous and proximity operations (RPO) control to traverse changing structures and avoidance of damaging the object they are inspecting. Whereas terrestrial construction and assembly and servicing actions have vantage points for up close human and sensor validation of joints, assemblies, connections, welds, and deposits along with the quality of materials used in the process, this aspect of quality assurance that comes from "in-person" inspection may not be possible in space servicing applications.

Accordingly, having a ubiquitous, independent highly compliant, and flexible system that can be deployed onto a space platform that is being assembled/built/serviced in some way, is cheap to make and operate, and can run entirely on solar power, may greatly enhance and accelerate on-orbit validations of new servicing or manufacturing processes.

SUMMARY

In at least one aspect, a mobile soft robot that can be adaptable to traverse the exterior of a spacecraft or space platform for the purpose of coupled or close-in inspection is provided. This robot is referred to as STARFISH. The project goals are to design and create a prototype, evaluate its characteristics to crawl and/or walk-in zero-G, look at the integration of various inspection methodologies, and investigate and design the power, communications, and locomotion constructs required to operate in Space. In development, the team focused on some key elements to start with, designing the body and limb geometries for ideal movement and "grip." Additionally, the team looked at locomotion methodology, electronic requirements, and shape memory alloy actuation behavior.

In another aspect, the present invention addresses the development and casting of various limb configurations for testing, optimizing the software to cut back on hardware requirements (see: duty cycle), and assembling a semi-functional prototype for analysis.

In another aspect, a fully functional prototype capable of not only movement can be assembled with the ability to maintain contact with a surface while moving in a zero-gravity environment.

In another aspect, a multi-armed robotic translation device is provided. The multi-armed robotic translation device includes a robotic body that includes a base section and a cover section attached to the base section. A plurality of tentacles is attached to the robotic body. The plurality of tentacles are configured to apply a shear force on the target object to grip the target object using an adhesive force, each tentacle including at least one shape memory alloy wire configured to move the tentacle. A control system is positioned in the robotic body and is configured to provide power and/or control signals to the tentacles.

In another aspect, the robotic body includes sensors embedded therein for close-in observation of another platform or body that the robotic body is attached to.

In another aspect, the target object is a satellite or other space body.

In another aspect, the robotic body is configured to stay connected to a target object.

In another aspect, the multi-armed robotic translation device includes a plurality of shape memory alloy wires.

In another aspect, the control system is configured to simultaneously provide a current to each shape memory alloy wire in the plurality of shape memory alloy wires.

In another aspect, the plurality of shape memory alloy wires is attached to a spring with each shape memory alloy wire attached to a plurality of windings in the spring.

In another aspect, the robotic body includes a power supply system and a communication system.

In another aspect, the control system for the multi-armed tentacles is distributed to each tentacle.

In another aspect, an elastomeric flexible material surrounds each tentacle of the plurality of tentacles, the elastomeric flexible material allowing for complete conformability to any surface and able to operate over any surface geometry that it is attached to.

In another aspect, each tentacle includes at least one adhesion tile positioned on each foot of the tentacle of the plurality of tentacles and configured to apply the shear force on the target object to grip the target object using the adhesive force.

In another aspect, each tentacle includes an electro-adhesion tile and a gecko adhesive tile at an end of the tentacles to conform or become compliant over and across contiguous and non-contiguous surfaces enabling shear force application between the tentacles.

In another aspect, the plurality of tentacles are configured to contact and translate over and on any type of object having any size, shape, configuration, orientation, attitude motion, or material that minimizes risk to a space object.

In another aspect, the multi-armed robotic translation device further includes an embedded sensor configured to detect any type of material or electrical or thermal anomaly.

In another aspect, the multi-armed robotic translation device includes multiple controllers using distributed software control through all the tentacles and configured to control, move or position the plurality of tentacles based on a detected configuration platform or object that it is translating.

In another aspect, the multi-armed robotic translation device further includes a second sensor positioned on each of the plurality of adhesion tiles and configured to detect an adhesive contact of each tile and thus shear forces on the target object. Characteristically, each individual tentacle controller is configured to adjust the position of the plurality of tentacles or the plurality of adhesion tiles based on detected shear forces and enable a multi-armed gait.

In another aspect, the control system includes multiple controllers using distributed software control through all the tentacles, the control system is configured to control, move or position the plurality of tentacles based on a detected configuration platform or object that it is translating.

In another aspect, the control system executes control software configured to detect and determine an optimized motion of tentacles to provide a gait or locomotion across a surface object and maintain a singular nadir force vector that always keeps the multi-armed robotic translation device attached to the target object.

In another aspect, an adhesive for contacting tentacles to the target object is an electro-adhesive and/or a gecko adhesive.

In another aspect, the plurality of tentacles includes a combination of tentacles that provide a geometric nadir force based on shear that is always applied to the object it is attached to through a combination of shear forces.

In another aspect, a robotic translation device is provided. The device includes a robotic body having a base section and a cover section that attaches to the base. The base section is configured to hold N-number of tentacles where N is an integer (e.g., 1 to 7). Moreover, the robotic body can host a central sensor of any type of wavelength or sensing system. One or more tentacles are coupled to the body and configured to provide constant grip and translation to a space object. One or more adhesion tiles are positioned on each tentacle of the one or more tentacles. The adhesion tile are configured to apply a shear force on the space object to grip the space object using an adhesive; and a distributed processing system. Characteristically, each tentacle has its own control but is coordinated with all other tentacles and configured to move or position the one or more tentacles based on shear forces on the space object for both constant contact or translation.

In another aspect, the multi-armed robotic translation device further includes a memory, a wired or wireless communication device, and a power supply system configured to provide power to move or position the one or more tentacles to keep the body and tentacles attached to a target object.

In another aspect, the one or more adhesion tiles and the one or more tentacles are reconfigurable and are configured to control or adjust an amount of the shear force applied by each of the one or more adhesion tiles and each of the one or more tentacles without losing the grip of the space object, wherein the one or more adhesion tiles are configured to be turned on or turned off to make a soft or hard contact to grab the space object.

In another aspect, the individual processors on each tentacle are configured to control shear forces on the space object for grip and for locomotion at the same time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein:

FIG. 5A. Perspective view of a coil-containing SMA wire actuator showing a coil with attached SMA wires.

FIG. 5B. Cross section of a coil-containing SMA wire actuator showing a coil with attached SMA wires.

FIG. 5C. Side view with wall removed showing a coil-containing SMA wire actuator showing a coil with attached SMA wires.

FIGS. 7-1, 7-2, 7-3, 7-4, 7-5, 7-6, 7-7, and 7-8. Gait pattern, active limbs in bold.

DETAILED DESCRIPTION

Figure 1A:
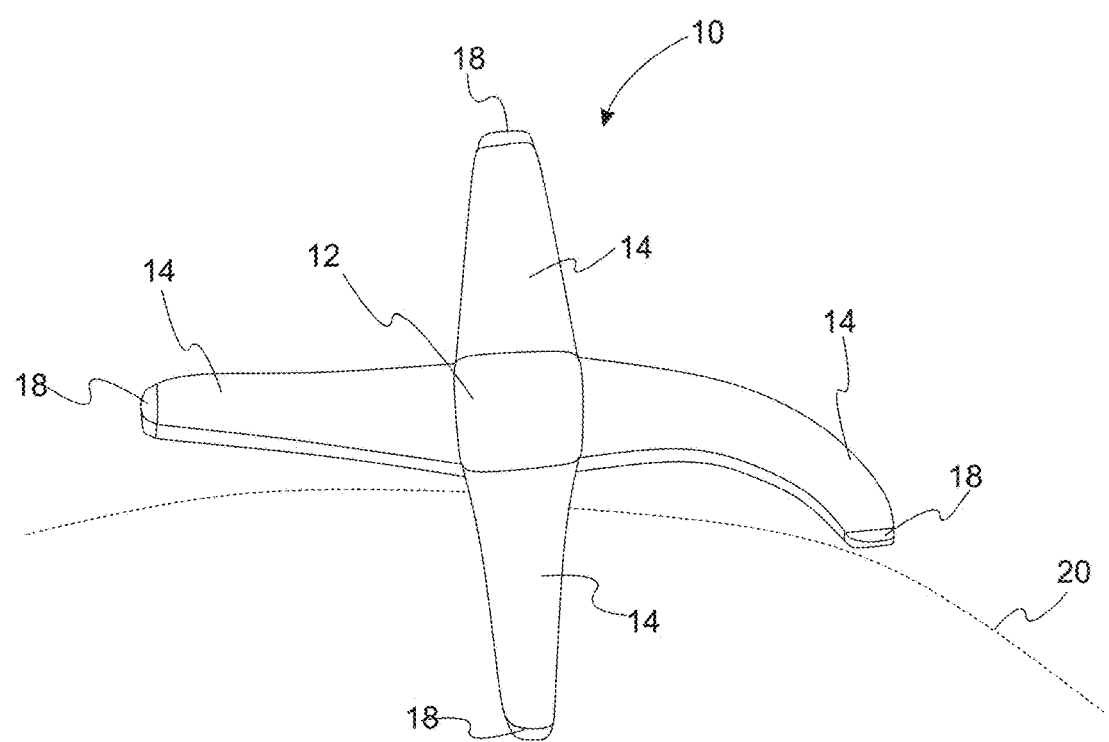
FIG. 1A. Top view of the multi-armed robotic translation device ("STARFISH")

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numerical quantity, in a refinement, the term "less than" includes a lower non-included limit that is 5 percent of the number indicated after "less than." A lower non-includes limit means that the numerical quantity being described is greater than the value indicated as a lower non-included limited. For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, 1 percent, or 0 percent of the number indicated after "less than."

For any device described herein, linear dimensions and angles can be constructed with plus or minus 50 percent of the values indicated rounded to or truncated to two significant figures of the value provided in the examples. In a refinement, linear dimensions and angles can be constructed with plus or minus 30 percent of the values indicated rounded to or truncated to two significant figures of the value provided in the examples. In another refinement, linear dimensions and angles can be constructed with plus or minus 10 percent of the values indicated rounded to or truncated to two significant figures of the value provided in the examples.

With respect to electrical devices, the term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve the processing of the electrical signal, including but not limited to, filtering of the signal, amplification of the signal, the rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" or "multiple" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Throughout this application, where publications are referenced, the disclosures of these publications in their entireties are hereby incorporated by reference into this application to more fully describe the state of the art to which this invention pertains.

Abbreviations

"PDMS" means polydimethylsiloxane.
"RPO" means rendezvous and proximity operations.
"SMA" means shape memory alloy.

In at least one aspect, a system for an orbital satellite and/or space platform that uses active and/or passive adhesive technology, such as electro-adhesive or gecko adhesive technology (EA/G), to facilitate the movement of a body around another body in orbit is provided.

Figure 1B:
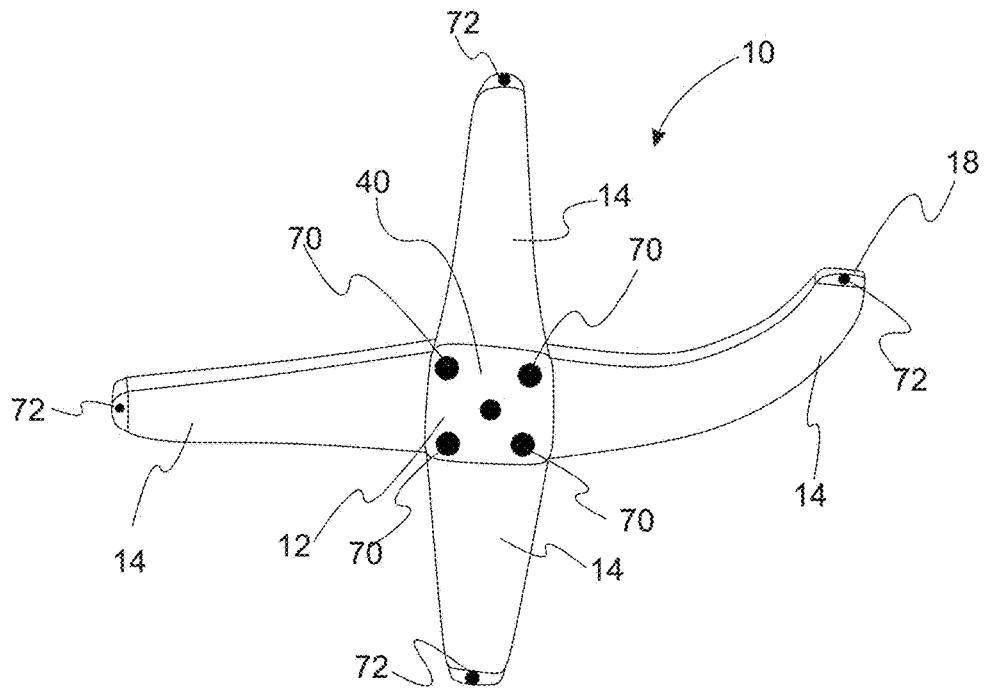
FIG. 1B. Bottom view of the multi-armed robotic translation device.
Figure 2:
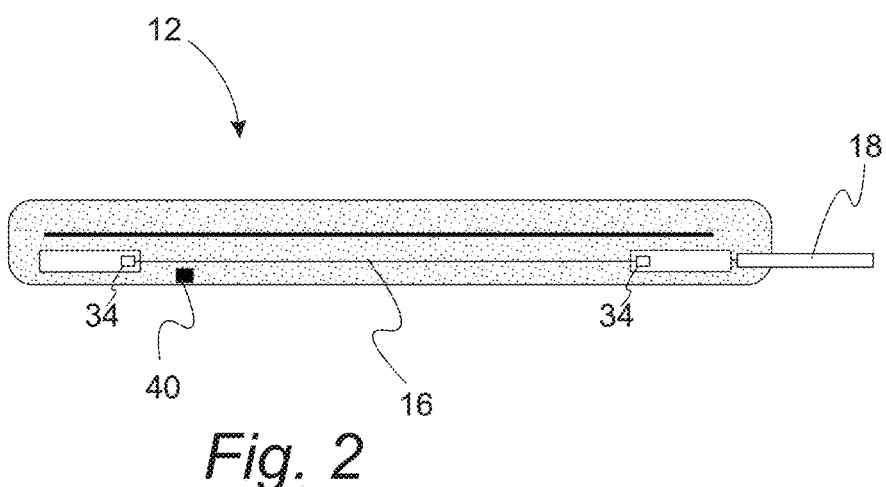
FIG. 2. Schematic of a tentacle attached to the STARFISH body.

Referring to FIGS. 1A, 1B, and 2, schematics of a multi-armed robotic translation device is provided. FIG. 1A provides a top view of the multi-armed robotic translation device while FIG. 1B provides a bottom view of the multi-armed robotic translation device. FIG. 2 provides a schematic of a tentacle attached to the body of the multi-armed robotic translation device. Sometimes, the multi-armed robotic translation device is referred to as "STARFISH."

Multi-armed robotic translation device 10 includes a robotic body 12 and a plurality of tentacles 14 attached to the robotic body. The plurality of tentacles 14 is configured to apply a shear force on a target object 20 to grip the target object using an adhesive force to keep translation device 10 connected to the target object. Advantageously, the plurality of tentacles 14 are configured to contact and translate over and on any type of object having any size, shape, configuration, orientation, attitude motion or material in a manner that minimizes risk to the target object (e.g., a space object). In a refinement, the plurality of tentacles 14 includes a combination of tentacles that provide a geometric nadir force based on shear that is always applied to the target object it is attached to through a combination of shear forces.

Although multi-armed robotic translation device 10 is not limited by the number of tentacles, typically multi-armed robotic translation device 10 is configured to hold N-number of tentacles where N is an integer providing the number of tentacles (e.g., 2 to 7). In a refinement, multi-armed robotic translation device 10 includes from 3 to 6 tentacles. In a variation, at least one adhesion tile 18 is positioned on each tentacle 14 of the plurality of tentacles and configured to apply the shear force on the target object 20.

Still Referring to FIGS. 1A, 1B, and 2, each tentacle 14 includes at least one shape memory alloy wire 16 configured to move the tentacle. Typically, target object 20 is a satellite or free flying space platform. Advantageously, robotic body 12 is able to be moved around another object 20 in orbit while never losing contact with the object. Control system 22 is positioned in the robotic body configured to provide control voltages and/or currents to the at least one shape memory alloy wire 16 and the adhesion tiles 18. In particular, control system 22 selected tentacle to be actuated for movement and attached to the target object. With respect to the shape memory alloy wires 16, actuation refers to a state where current is flowing through the wires thereby causing heating and deformation of the wires. Control system 22 "activates" certain limbs by sending a signal through the micro-controller to allow a current generated from a battery to pass through the SMA wires, the actuators. As the current passes through the SMA wires, the temperature of the wire increases, and as it passes a critical point it causes the wire to contract. This happens on a very small timescale.

Shape memory alloy wires 16 are composed of a material that deforms when a current is applied to the wire. Examples of such material include metal alloys of nickel and titanium (e.g. Flexinol and NiTinol wires). Although virtually any diameter wire can be used, typical wire diameters are 100 to 500 µm. In a refinement, the shape memory alloy wires 16 bends when a current is applied. Although the current applied to each wire will depend on the wire's properties and the specific construction of the Multi-armed robotic translation device 10, useful currents can be from about 100 mA to 2 A. It should also be appreciated that the structural transformation that operates when the SMA wire is heated also causes a variation in its electrical properties. Therefore, the linear resistance of the wire depends on its temperature. The easiest way to heat the wire is to use the Joule effect by passing an electric current through it. So, in order to prevent overheating and therefore damage the wire, the temperature of the SMA wires is controlled by monitoring its resistivity. For this purpose, a calibration curve is created to establish the resistivity/temperature relationship to control the current that it sent through the wires. The nonlinearity of the properties of the SMA wire forms a hysteresis cycle. The calibration curve will allow two resistance thresholds to be defined for which we can consider that the wire can be considered in its martensitic phase, R=Rm or in its austenitic phase, R=Ra. We immediately have Rm≥Ra. Thus, it will be imperative that the resistivity of the actuator does not go below Ra, so as not to overheat it. A first current control strategy can be established according to the resistivity of the wire according to the following formula:

$$I(R) = I_{rec} \frac{R_m - R}{R_m - R_a}$$

Where:

I is a target current to provide to the wire;

R is the measured resistance of the wire;

$R_m$ is the resistance threshold for the martensitic phase;

$R_a$ is the resistance threshold for the austenitic phase; and $I_{rec}$ is the heating recommended current, defined by the manufacturer. The value of the resistivity can be related with the strain ε of the SMA wire and therefore with the position of the "limb" being operated. This is called the "resistance feedback". In this regard, control system 22 can be in communication with sensors that monitor the resistances of the wires Referring to FIG. 2, each tentacle 14 includes at least one shape memory alloy wire 16 attached to a first circuit board 30 which is in electrical communication with the control system 22 and a second circuit board 32 in electrical communication with adhesion tile 18. When a tentacle is selected for actuation, a current flows through between an electrical bus 34 on the first circuit board 30 through to an electrical bus 36 on the second circuit board 32. In a variation, each tentacle 14 includes a plurality of shape memory alloy wires 16. In a refinement, the tentacles are simultaneously actuated with current flowing through each tentacle in the plurality of tentacles. In another refinement, control system 22 can select individual shape memory alloy wires 16 for activation while some shape memory alloy wires 16 are not actuated.

In a variation, the shape memory alloy wires are embedded in or covered by an elastomeric material. In a refinement, the first circuit board 30, second circuit board 32, and the adhesion tiles are independently embedded in or covered with the elastomeric material. The multi-armed robotic translation device 10 includes an elastomeric flexible material on each of the plurality of tentacles that allows for complete conformability to any surface and the ability to operate over any surface geometry that it is attached to. As described below, the elastomeric flexible material can include electro- and gecko adhesive adhesion tiles at the end of the tentacles to conform or become compliant over and across contiguous and non-contiguous surfaces enabling shear force application between the tentacles. Examples of elastomeric material includes silicones (e.g., PDMS) or polyimide (e.g. poly-oxydiphenylene-pyromellitimide known as KAPTON™).

Figure 3A:
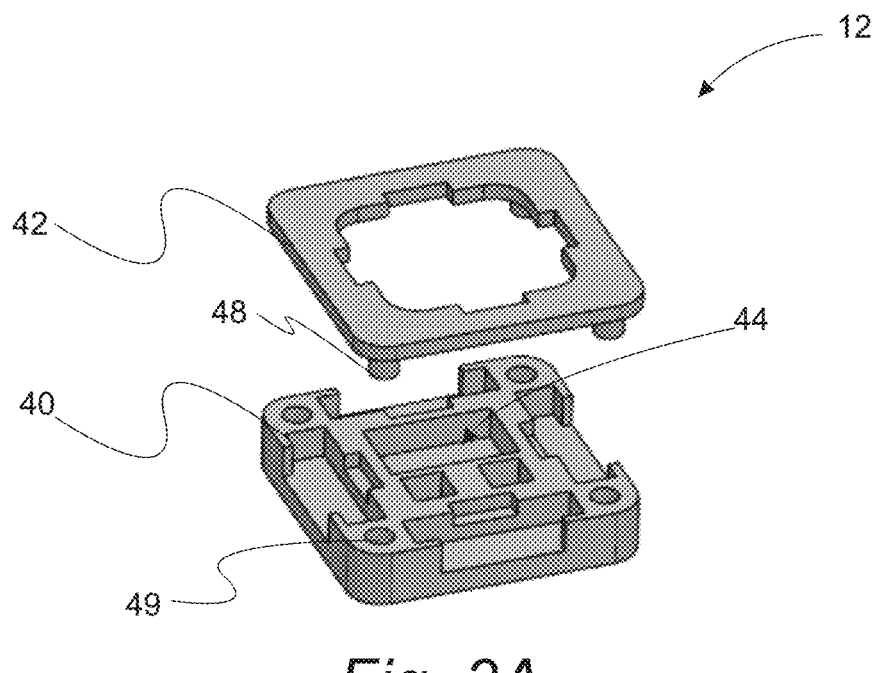
FIG. 3A. Example of a robotic body having attachment recesses for 4 tentacles.
Figure 3B:
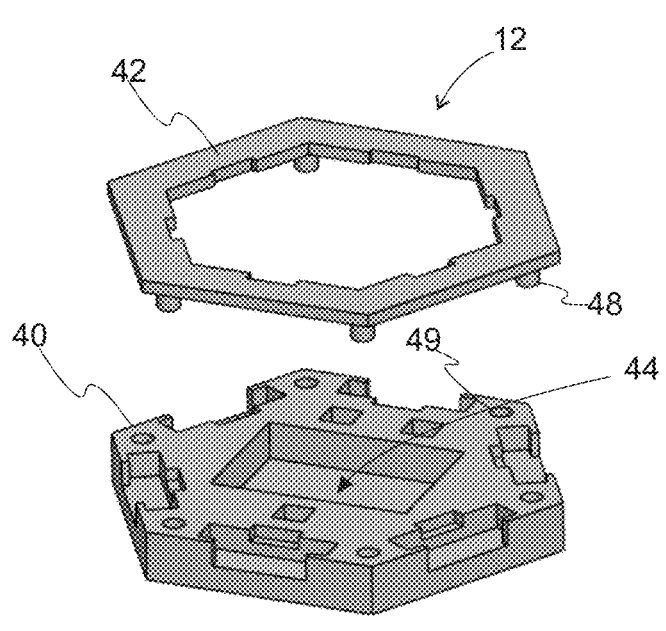
FIG. 3B. Example of a robotic body having attachment recesses for 6 tentacles.

Referring to FIGS. 3A and 3B, schematics of robotic bodies are provided. As set forth above, Multi-armed robotic translation device 10 can include a plurality of tentacles 14 (e.g., 3, 4, 5, 6, or 7 tentacles). FIG. 3A provides an example of a robotic body having attachment recesses for 4 tentacles while FIG. 3B shows an example of a robotic body having attachment recesses for 6 tentacles. Each robotic body 12 includes a base section 40 and a top section 42. Base section 40 defines a recess 44 into which at last a portion of control system 22 is positioned. Base section 40 also defines attachment recesses 46 into which an end of the tentacles is positioned and held in place when the top section is attached to the base section. In this regard, top section 42 includes pegs 48 that fit in openings 49 defined by base section 40.

Figure 4:
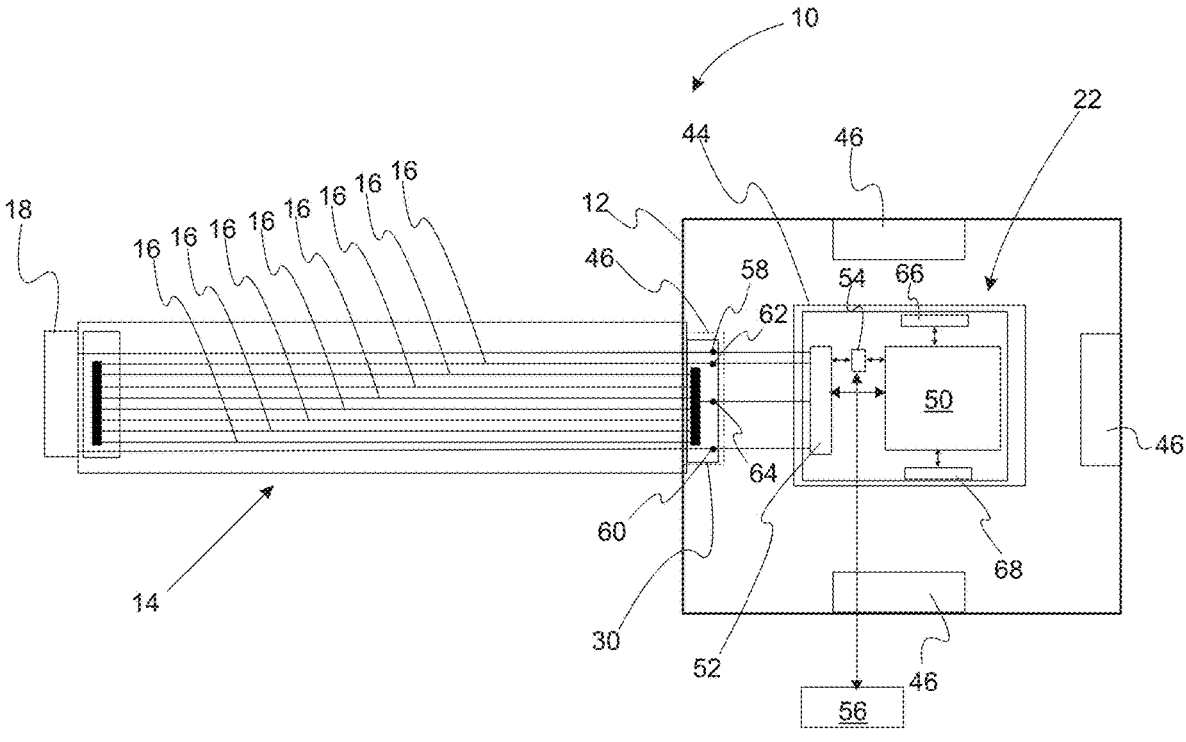
FIG. 4. Schematic of a single tentacle attached to a base section.

Referring to FIG. 4, a schematic of a single tentacle attached to a base section is provided. Advantageously, the robotic body 12 has its own power and communication subsystems. In this figure, first circuit board 30 is positioned in attachment recess 46 while control system 22 is positioned in recess 44. Control system 22 can include one or more microprocessors 50. Control circuitry 52 and onboard power supply system 54 can be used for powering tentacles 14 via control circuitry 52 which is described above. Power supply system 54 is configured to provide power to move or position the one or more tentacles to keep the body and tentacles attached to the target object. In particular, the control circuitry can provide a voltage and/or current across points 58 and 60 for powering adhesion tile 18. Similarly, a voltage can be supplied across points 62 and 64 for providing current to SMA wires 16. Power supply system 54 can also power the microprocessor(s) in the control system 22. In a variation, multi-armed robotic translation device 10 can include a solar cell or solar cell array 56 for charging power supply system 54 and/or powering the device. Solar cell or solar cell array 56 can be mounted on an external surface of the robotic body or tentacles for this purpose. In a refinement, control system 22 also includes wired or wireless communication system 66 that allows multi-armed robotic translation device 10 to be monitored and controlled remotely. Control system 22 can also include memory 68 which stores the control software and/or any data collected. Typically, control system 22 implements (i.e., executes) control software that is able to detect and determine an optimized motion of tentacles to provide a gait or locomotion across a surface object and maintain a singular nadir force vector that always keeps the multi-armed robotic translation device attached to the object.

Still referring to FIG. 4, it should be appreciated that the control system 22 for the multi-armed tentacles can be distributed to each tentacle. In this scenario, the tentacles do not use a central core processor but instead, each tentacle has a control system having the design of control system 22. For example, the control system is distributed to the tentacles via the first circuit board 30 and control circuitry 52 which are provided for each tentacle, and optionally a microprocessor 50 for each tentacle. In a refinement, an individual microprocessor on each tentacle is configured to control shear forces on the space object for grip and for locomotion at the same time. In this regard, multiple controllers 22 and in particular, multiple microprocessors are provided using distributed software control through all the tentacles and configured to control, move or position the plurality of tentacles based on a detected configuration platform or object that it is translating. In this scenario, the microprocessors would coordinate the movement of the tentacles.

Referring to FIGS. 1B, 2, 3A, 3B, and 4, the robotic body includes sensors embedded therein for close-in observation of another platform or body that the robotic body is attached to. For example, the robotic body can include one or more embedded sensors 70 configured to detect any type of material or electrical or thermal anomaly on the target object. Multi-armed robotic translation device 10 can further include one or more sensors 72 positioned on each of the plurality of adhesion tiles and configured to detect an adhesive contact of each adhesion tile and thus shear forces on the target object. Characteristically, each individual tentacle controller is configured to adjust the position of the plurality of tentacles or the plurality of adhesion tiles based on detected shear forces and enable a multi-armed gait. In a refinement, robotic body 12 can host a central sensor 74 that can be any type of light wavelength measuring or sensing system. Each of the sensor are typically in electrical communication with control system 22.

Referring to FIGS. 5A, 5A, and 5B, schematics of a coil-containing SMA wire actuator are provided. FIG. 5A provides a perspective view of a coil-containing SMA wire actuator showing a coil with attached SMA wires. FIG. 5B provides a cross-section of a coil-containing SMA wire actuator showing a coil with attached SMA wires. FIG. 5C provides a side view with a wall section removed to show the coil-containing SMA wire actuator showing a coil with attached SMA wires. Coil-containing SMA wire actuator 80 includes SMA wires 16 attached to spring 82 (i.e., a coil having a plurality of windings). The coil can be composed of metal or plastic or a combination thereof. In a refinement, each SMA wire is attached to spring 82 such that a plurality of windings of the coil is traversed and attached to the SMA wire. Actuation of the SMA wires can now allow movement of the tentacle in multiple directions. For example, a tentacle can be actuated to move to the left or right relative to a direction facing the end with the attached adhesion tile. In a refinement, SMA wires 16 attached to spring 82 can be surrounded by layer 84 of elastomeric material or embedded in elastomeric material as described above.

Figure 6A:
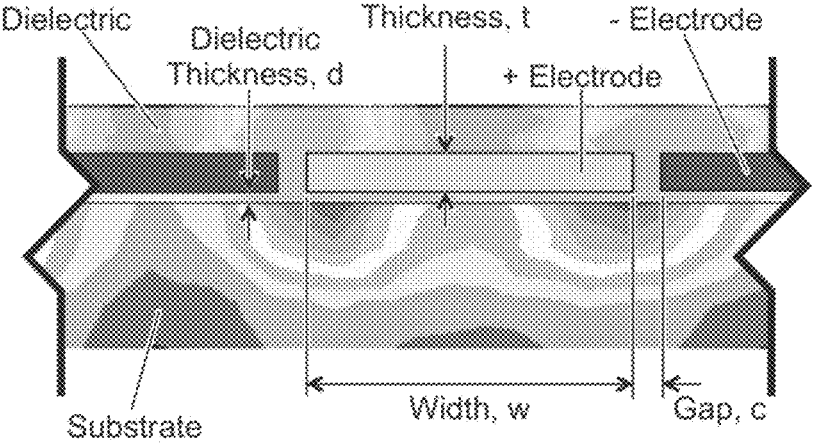
FIG. 6A. Illustration of an active (electrostatic) adhesive tile.
Figure 6B:
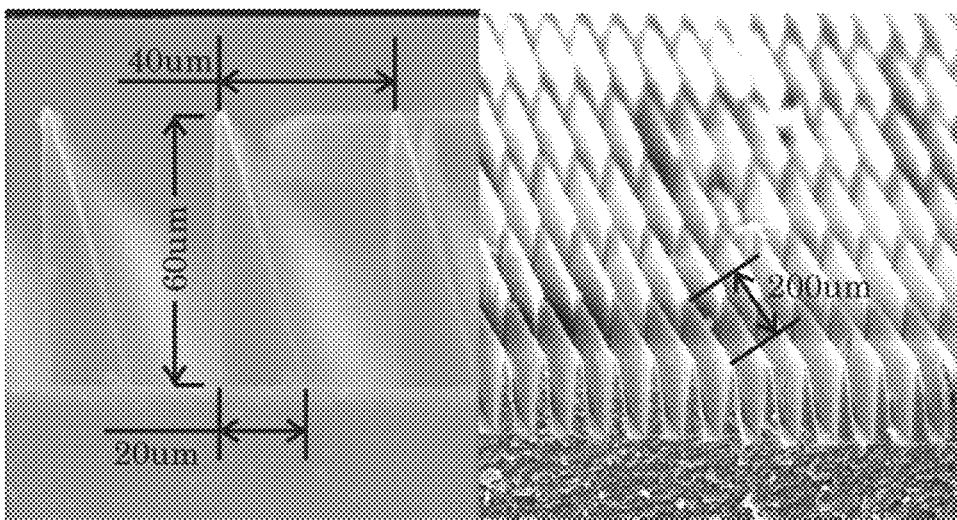
FIG. 6B. Illustrates of a passive (Gecko-like) adhesive tile.

As described above, adhesion tiles are positioned on the ends of each tentacle. These adhesion tiles can be active (electrostatic) adhesive tiles and/or passive (Gecko-like) adhesive tiles. FIG. 6A illustrates an example of an active (electrostatic) adhesive technology while FIG. 6B illustrates an example of a passive (Gecko-like) adhesive technology included in the adhesion tiles. Details for the active adhesive technology and the passive adhesive technology are provided in US Pat Pub No. 20210094709; the entire disclosure of which is hereby incorporated by reference. Electrostatic adhesion functions by utilizing a high voltage differential across a set of inter-digital electrodes to generate a strong local electric field. This electric field polarizes the surface material creating a surface charge buildup and thus adhesion. The advantage of electrostatic adhesion is that it generates an adhesive force on a wide variety of surfaces ranging from glass and steel to rougher surfaces such as wood and concrete. The disadvantages of electrostatic adhesives are that the adhesion level is relatively weak and is highly dependent on the separation gap between the adhesive and target substrate. Electrostatic adhesion is shown to be one of the more robust attachment mechanisms since it is both controllable and effective over a variety of surface roughness-es and compositions including conductors, semiconductors, and insulators. Electrostatic adhesives are especially promising for space applications because they can operate in a vacuum, do not utilize chemical bonds, and may require no preload force on the target surface.

Gecko or dry adhesives are based on the behavioral traits of geckos. The adhesive includes a micro-structure surface which is used to create a large real-area-of-contact with a substrate and generate adhesion through Van der Waals forces. Two different varieties of dry adhesives generally exist; non-directional and directional dry adhesives. Non-directional dry adhesives typically consist of micro-scale straight vertical stalks with a mushroom-shaped tip to provide improved contact area. They typically generate high adhesion on very smooth surfaces but are not controllable and have reduced adhesion to rough surfaces. Directional gecko-like adhesives, on the other hand, are typically asymmetric structures which deform to provide geometric local compliance with the target surface and generate adhesion when loaded in a preferred direction. Load sensitivity of the adhesive provides a form of ON/OFF control and greater micro-scale surface conformation. The directional dry adhesive to be used in the proposed work has been developed at JPL and consists microscopic triangular wedges about 20 μm wide at their base, 60 μm-70 μtall, and about 200 μm long. The adhesive or wedges have directionality in that they use asymmetric micro-structured hairs (the wedges) that bend to create a high area of contact when loaded in a preferred shear direction.

In a variation, a hybrid combination of electrostatic adhesion ("EA") and Gecko-like adhesion has been shown to increase the shear force applied to any object and multiple substrates. Therefore, each tentacle can include an electro-adhesion tile and a gecko adhesive tile at an end of the tentacles to conform or become compliant over and across contiguous and non-contiguous surfaces enabling shear force application between the tentacles. The electrostatic adhesive provides initial clamping to the target surface and allows for macro macro-scale conformation due to the generated attraction force and flexibility of the EA film. This high surface contact then allows a significant percentage of the gecko-like adhesive hairs to engage with the target substrate when loaded. As the gecko-like adhesive hairs engage the micro-scale surface conformations they reduce the gap distance between the EA and substrate, further increasing its effectiveness. This interaction provides the synergistic effect that enables greater overall adhesion, which is often greater than the sum of the individual adhesives.

The following examples illustrate the various embodiments of the present invention. Those skilled in the art will recognize many variations that are within the spirit of the present invention and the scope of the claims.

The advent of "building" platforms in Space through autonomous robotic systems is still very new. All space systems typically go through validation on the ground with environmental tests prior to launch. But for new assemblies in Space built without direct human contact, there are limited methods to provide that validation post-build or assembly externally. The inspection of resulting mechanical or electrical assemblies in zero-g/vacuum of non-linear assemblies with various structural/electronic/manipulation elements may be done by free-floating stand-off devices or proximity robotic end effectors, but these solutions are costly, complex, and limited in scope. A solution here is to place an inspection or validation device directly on the surface of the newly assembled platform. The system would need to be flexible to multiple geometries, scale-able to different sizes, use very low power, and be extremely lightweight and very low volume to pack onboard spacecraft. STARFISH is meant to provide that potential solution. Our team at the SERC considered a number of potential methods to do verification and validation or inspection of non-linear constantly evolving assemblies in Space. STARFISH falls at the intersection of simplicity, low mass, and ease of placement into the assembly environment. STARFISH came about as an extension of a past research project at SERC called REACCH, which began to explore how to make docking and grasping easier without pre-determined interfaces. REACCH was a bio-inspired project to create a simple, easily deployable, smart, low mass and cost mechanism that replaces the need for very high cost and risk contact docking, to enable capture of any object, cooperative and/or non-cooperative, in Space. A vital piece of technology carried over from REACCH is Electroadhesive/Gecko adhesion technology, which utilizes low amounts of power to generate a high amount of grip. Historically, in-space capture is executed through pre-defined and mechanically fixed interfaces—REACCH offers the ability to service a variety of satellites and space structures without pre-determined grip interfaces. [1] Thus, having a ubiquitous, highly compliant, and flexible system or element that can be deployed on an assembly in orbit, that is cheap to make and operate, and can run entirely on solar power could be a solution for on-orbit validations. STARFISH expands on the REACCH concept incorporating tried and true concepts of soft robotics with Electro/Gecko-adhesion technology to create a "walking" inspection robot that is fully compliant, and that survives in Space. The EA technology relies on small scale electrical interactions [2] [3] while the gecko technology mimics the van der Waals adhesion from gecko setae via micro grooves and fibers [4] [5]. STARFISH is also bio-inspired as it looks and operates similarly to its namesake, in that with unique design it can "walk", "crawl", "round corners", and "grow or shrink" as needed to inspect any type of structure on orbit. The advent of soft robotics offers a unique method to transfer the load path required for translation of an object, or grasp over a surface area to minimize potential damage and maximize "hold".

In robotics research, the challenge is how to maximize the "compliance vs. control" trade space to allow a "walking" robot to move over non-linear geometries at will. One of the challenges the team is investigating is determining the valid metrics for "compliance" and "control", that allows analogous comparison between various robotic concepts and STARFISH. Some other key challenges include maintaining grip and moving while maintaining that grip with the surface in zero gravity.

1. Design and Models
1.1 Locomotion Methodology

Figures 1, 2, 3, 4, 5, 6, 7, 8:
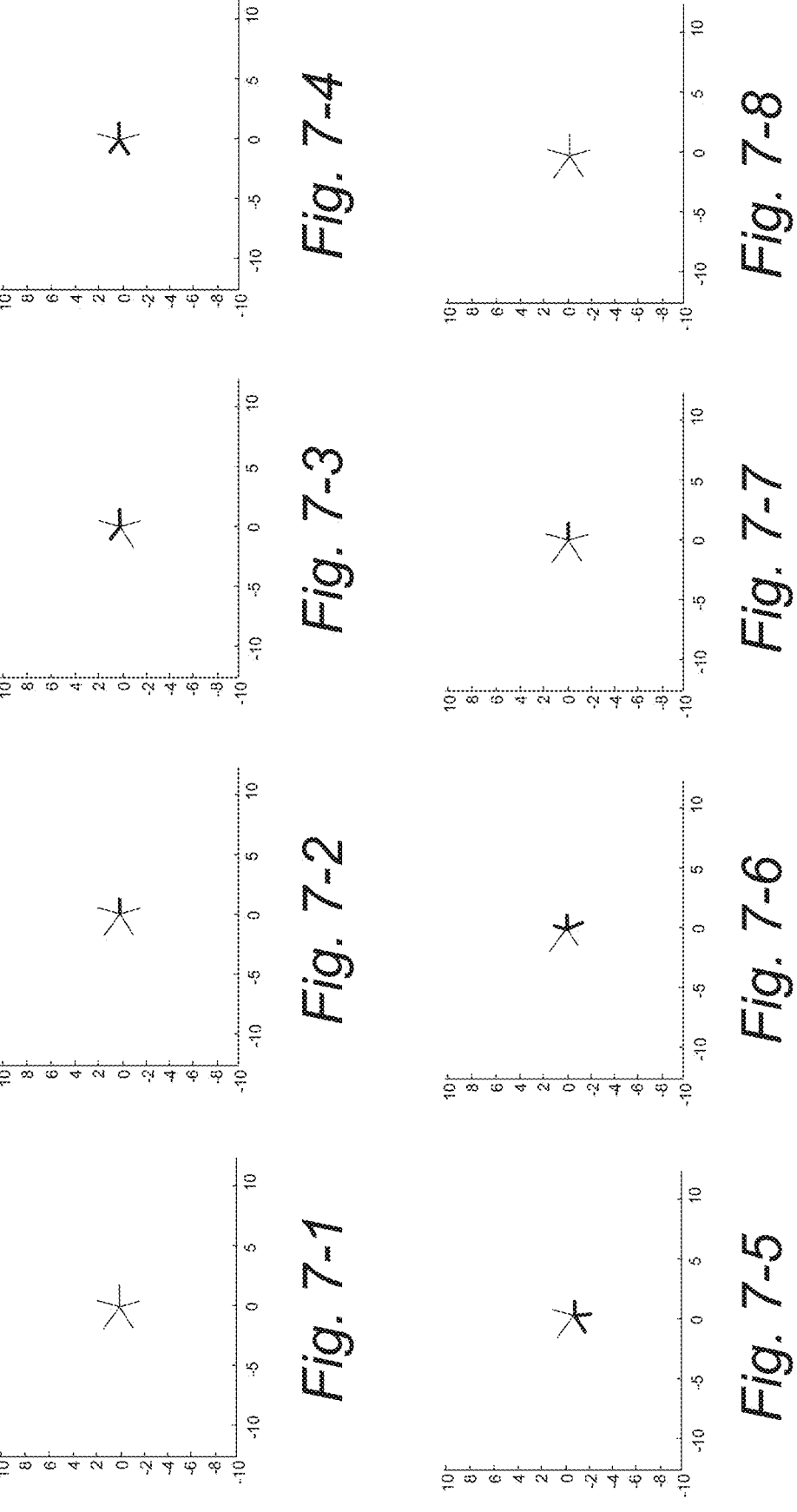

Initial research was performed to better understand what sort of locomotion or gait would be employed, and what would potential pitfalls or constraints might be in place as we developed the prototype. Functions that simulate the contraction or extension of a limb in which multiple parameters (e.g. length of the limbs, the ratio between the normal state and the bent state, efficiency of the displacement, etc.) could be controlled were created. Finally, functions that simulate a full cycle, display the new body center position after one cycle and represent the locomotive pattern step-by-step was created. FIG. 7 shows a representation of the gait pattern for a five-limbed geometry. The contracted limbs are highlighted by thick line while the others are represented by thinner lines. The activating of certain limb combinations achieve movement in a specific direction.

The decision to use shape memory alloy wire based actuation came from the realization that typical soft robotics methods, which would be able to achieve the actions needed to generate movement, would be hindered by the shortcomings of fluid behavior in zero gravity environments. [6][7]

1.2 SMA Skeleton

Shape memory alloy wires are thin, hairlike wires that have an interesting behavior—when heated past a certain temperature, they change shape, returning to a previous state configuration depending on the manufacturing process. The most common SMA is called NiTinol, equal parts nickel and titanium. Shapeshifting is dependent not only on temperature but also stress experienced by the wires. This is possible because these alloys can be in two main phases with very different mechanical and electrical properties, depending on their temperature: martensite for low temperatures and austenite for higher temperatures. Martensitic phases can be easily deformed due to asymmetric structure, while austenitic phases have a crystalline structure that does not allow orientation variations. The transition from martensitic to austenitic is known as the martensitic transformation, and it results in a return to the initial shape, generating a force that drives SMA wire actuation methods.

Figures 8A, 8B:
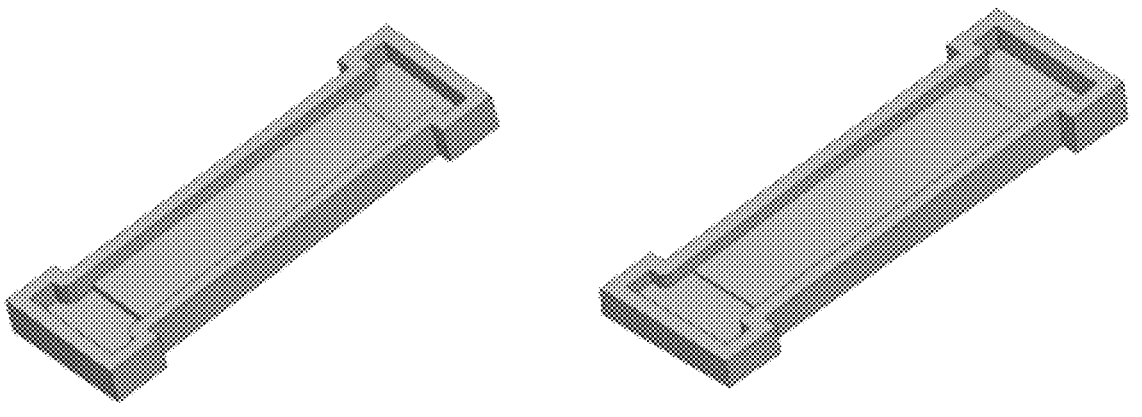
FIG. 8A. Schematic of a symmetrical mold for forming tentacles.
FIG. 8B. Schematic of a mold for forming tentacles with a 1.5 degrees inclination.

To actuate STARFISH, an SMA "skeleton" inspired by work done by researchers at the University of Science and Technology of China [8] was designed. FIGS. 8A and 8B provide examples of molds that are used in STARFISH. FIG. 8A provides a schematic of a symmetrical mold while FIG. 8B provides a schematic of a mold with a 1.5 degrees inclination. However, the "skeleton" of the present work is designed to have multiple SMA wires soldered onto two PCBs which allows them to be supplied with power. An electro-adhesion adhesion tile is added on the limb extremity which is in contact with the ground so that the robot can generate a strong grip on non-terrestrial surfaces, including under weightless conditions (zero-G).

1.3 Limbs 1.3.1 Substrate

Initially, the specific prototype development process was focused on proof of concept, and not space-rated material properties. Therefore, simple and low cost soft materials was utilized. ECOFLEX™ was chosen as a simple and quick material to create soft bodies. Multiple molds were created to test out the specific curing time, thickness levels, and geometries. The characteristics of the substrate used in the casting of a STARFISH limb are listed in Table 1.

TABLE 1

| Substrate Data Ecoflex 00-30 data | |
| --- | --- |
| Specific gravity | 1.07 g/cc |
| Specific volume | 26.0 cu. in/lb |
| Shore hardness | 00-30 |
| Tensile strength | 200 psi |
| 100% modulus | 10 psi |
| Elongation at break | 900% |

Materials that are soft and conform to a specific hardness rating are desirable. In the first instantiation, the 00-30 Shore Hardness rating was investigated. The Shore Hardness scale was designed to provide a common reference for the softness/hardness of different materials. Shore 00 represents very soft rubbers and gels, and Shore 00-30 will have a similar hardness to a soft-gel shoe-insert. "Soft 3D printed materials" that retain a higher level of compliance after they are extruded than normal ABS plastic were also investigated. Flexfill 98A was used to test out printing "bodies" that would retain some flexibility connected to the limbs during our prototype development.

1.3.2 Assembly and Casting

In one example, limbs are made up of a skeleton composed of two printed circuit boards connected by Shape Memory Alloy wires and a commercial, off-the-shelf polymer. The polymer, also used in Hollywood prosthetics, provides for terrestrial prototyping and testing, suitable flexibility and coverage to mimic the desired end result of a space-certified polymer. The SMA wires are tied to small loops at the end of thicker, traditional wires and crimped in place—the traditional wires are then soldered to the PCBs, such that the SMA wires are preserved during the soldering process, along with power wires which protrude outside the polymer skin of the arm. The assembled skeletons are then placed in an arm mold such that the SMA wires are taut— this is an important step, as loose SMA wires will not provide the necessary level of bend for motion. A first layer of liquid, uncured polymer is poured into the mold, followed by a thin, flexible, 3D-printed rectangular plate that provides support to the limb and directs the bending movement. A final layer of polymer is poured, and the entire setup is allowed to cure overnight. The final product is a flexible and soft system for actuation.

To test for ideal limb function, several different types of limbs were cast with different thicknesses of shape memory alloy wire skeletons, different skin materials, and different arm bar thicknesses. Thinner arm bars provide greater bend but less stability. Thinner SMA wires improve the total bend amount to a certain degree, after which thinner SMA wires don't provide a significant advantage. The skin materials we tested did not significantly impact the final bend or functionality of the arms.

1.4 Body

Several bodies have been designed for the robot, models that can fit 4 to 6 limbs (see, FIGS. 3A and 3B). While a STARFISH with 6+ limbs will most likely be the ideal final product in terms of being able to both move and maintain a grip force on a surface, short-term prototyping and proof of concept could be demonstrated more simply with the 4-sided bot. During prototype tests, it was found that the body was too heavy for 1 g movement. However, 0 g movement would not be hindered.

1.5 Prototyping

A four-limb STARFISH was assembled for prototyping purposes. The arms proved to not be strong enough to move the robot in 1 g. However, the limbs did demonstrate a significant range of motion, with bends at the midpoint reaching 90 degrees and beyond. In zero gravity the main force requirement would be the force directed in towards the surface on which the robot is crawling to not lose contact while in operation. The prototyping that took place was also done without electroadhesion/gecko adhesion tiles, which greatly improve the generated gripping forces, allowing the robot to move while maintaining grip on off-nominal surfaces (walls, zero gravity environment). [1] [2]

2. Analysis and Results 2.1 Stress and Strain

As it is observed, the martensitic transformation of the SMA wire allows the wire to pass from a deformed state to its initial state and it is this change of state which creates its movement. Since the properties are different depending on the proportion of the two phases constituting the alloy, hysteresis appears. It appears that the same stress applied to the wire will cause a much greater deformation if it is in its martensitic phase than if it is in its austenitic phase. Thus, forcing the phase change by heating the actuator under stress will change its deformation and create the movement. Additionally, the SMA wires have large force/weight ratios, ideal for keeping mass low in a space qualified bot. [9]

Three different diameters of FLEXINOL® muscle wire actuators were studied: 100, 150, and 250 microns. The 100 micron wire proved ineffective, any knots placed along it tended to slide apart. The 150 and 250 micron wires both still have good force/weight ratios, significantly greater than force/weight ratios offered by traditional actuators like electric motors.

2.2 Current and Resistance

In previous work, it was established that the structural transformation that takes place when an SMA wire is heated also impacts its electrical properties. This would allow us to control the temperature of the wire by monitoring resistance.

However, due to some technical issues, it was necessary to work around the inability to measure the resistance constantly.

Figure 9:
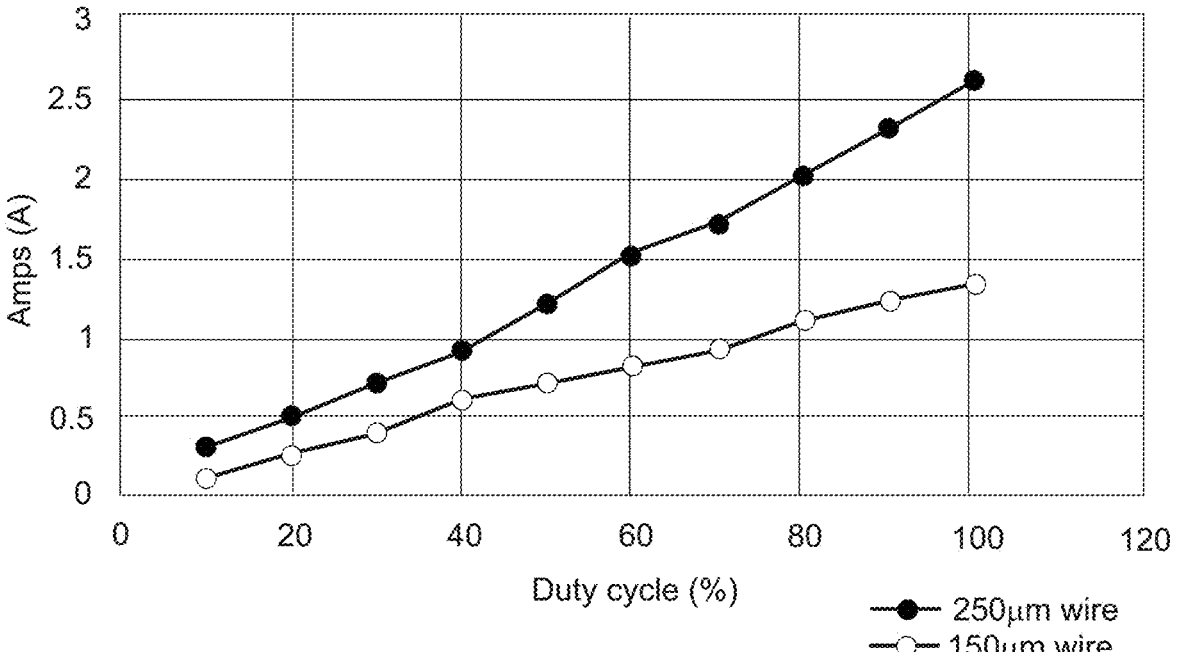
FIG. 9. Relationship between duty cycle and current.
Figure 10:
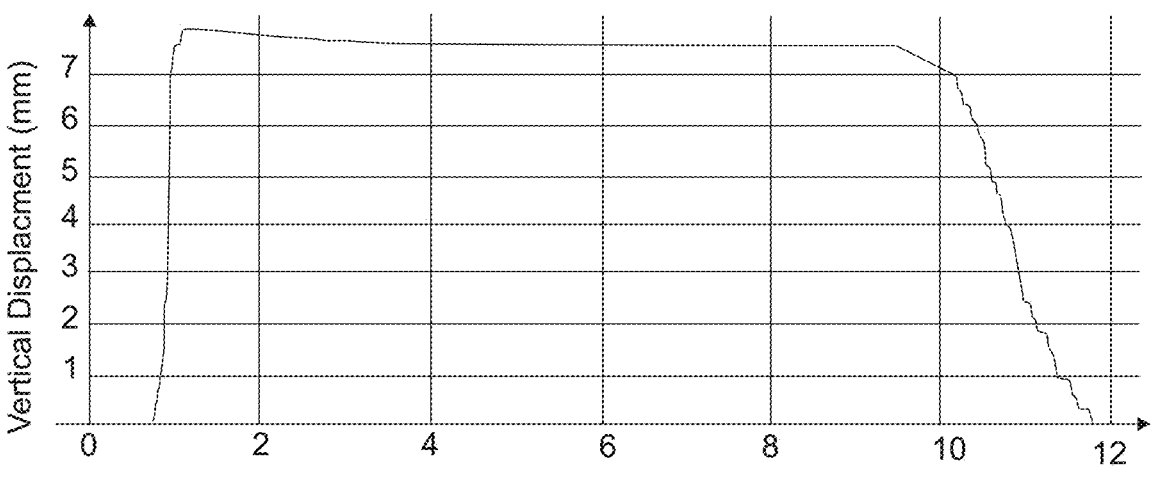
FIG. 10. Vertical displacement of a 1 kg weight by shape memory alloy wire.

The behavior of the wires in relation to the duty cycle was analyzed. The proper cycles along which to activate the wires were calculated. This information allows overheating and damage to the wires to be avoided. FIG. 9 shows the relationship between the current and duty cycle for two different thicknesses of SMA wire. FIG. 10 shows the vertical displacement data for a single 1 kg mass hung from. The change in wire length during contraction is related to the physical properties of the wire. Thinner wires have produced greater displacements as a result of the amount of surface area of the different wires alloy wire.

The ideal limb configuration for maximum bend with adequate stability and arm strength is a 0.4 mm to 0.5 mm arm bar with 150 micron shape memory alloy wires and a skin made with a soft, flexible rubber. This configuration allowed for a 90 degree and greater bend of a limb, compared to a near 40 degree bend with the thicker arm bar but same shape memory alloy wire, and significantly greater than the 10 to 15 degree bend with the thicker arm bar and the thicker SMA wires. None of these configurations provide the necessary strength alone to move the STARFISH significantly in a terrestrial, 1 g setting.

2.3 Software and Electronics

The ability to perform multiple processes simultaneously (i.e., operating different combinations of limbs to achieve different results) is required. The microcontroller used in early phases of the design and testing process cannot support parallel processing. This wasn't an issue while we were experimenting with single limbs, SMA wire behavior, and the like, but as we increased the number of limbs in testing the problem became apparent.

It was thought that one could cycle through the limbs required for a set of movements or actions in rapid-fire succession, such that the wires would remain contracted and the limbs bent, maintaining a force on the surface of whatever body the STARFISH is on.

Figure 11:
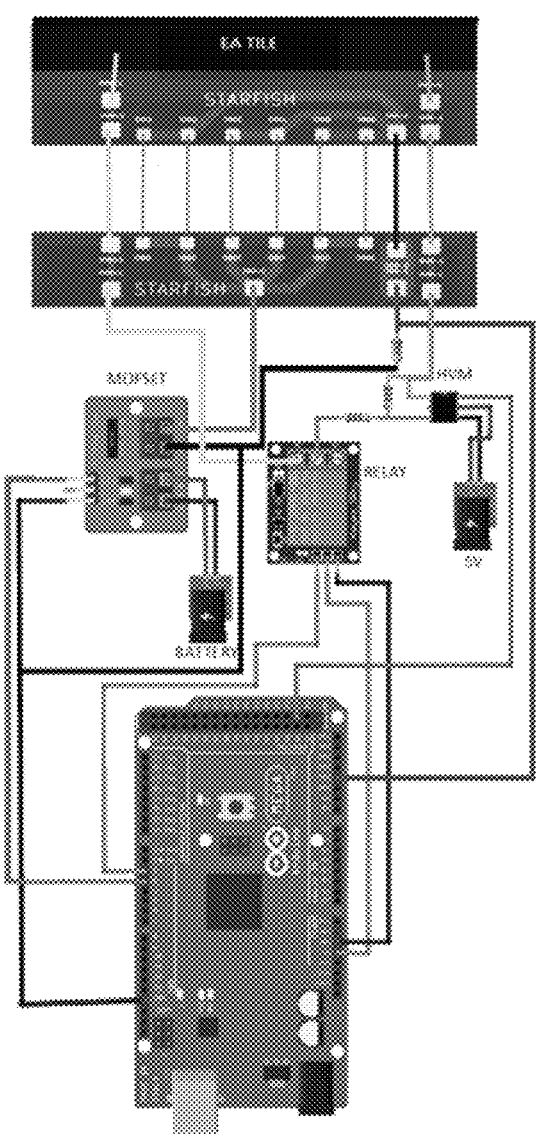
FIG. 11. Electronics arrangement.

The software "activates" certain limbs by sending a signal through the micro-controller to allow a current generated from a battery to pass through our SMA wires, the actuators. As the current passes through the SMA wires, the temperature of the wire increases, and as it passes a critical point it causes the wire to contract. This happens on a very small timescale. See FIG. 11 for a detailed schematic of the electronics. The control software is designed to be able to activate multiple limbs simultaneously to create movement and to generate a surface-pointing force to maintain contact with bodies in zero-g environments. This will require adjusting our electronics to account for the need for parallel processing, either introducing a processor capable of multiple simultaneous processes or multiple individual microprocessors.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] Narayanan, Sriram, et al. "REACCH—Reactive Electro—Adhesive Capture Cloth Mechanism to Enable Safe Grapple of Cooperative/Non-Cooperative Space Debris." AIAA Scitech 2020 Forum, 2020, https://doi.org/10.2514/6.2020-2134.
[2] Donald Ruffatto III, Jainam Shah, and Matthew Spenko. "Optimization and experimental validation of electrostatic adhesive geometry." In: 2013 IEEE Aerospace Conference. IEEE. 2013, pp. 1-8.
[3] Donald Ruffatto III, Aaron Parness, and Matthew Spenko. "Improving controllable adhesion on both rough and smooth surfaces with a hybrid electrostatic/gecko-like adhesive." In: Journal of The Royal Society Interface 11.93 (2014), p. 20131089.
[4] Kellar Autumn et al. "Evidence for van der Waals adhesion in gecko setae." In: Proceedings of the National Academy of Sciences 99.19 (2002), pp. 12252-12256.
[5] Burak Aksak, Michael P Murphy, and Metin Sitti. "Gecko inspired micro-fibrillar adhesives for wall climbing robots on micro/nanoscale rough surfaces." In: 2008 IEEE International Conference on Robotics and Automation. IEEE. 2008, pp. 3058-3063.
[6] Daniela Rus and Michael T Tolley. "Design, fabrication and control of soft robots." In: Nature 521.7553 (2015), pp. 467-475.
[7] Zhongliang Jing et al. "An overview of the configuration and manipulation of soft robotics for on-orbit servicing." In: Science China Information Sciences 60.5 (2017), p. 050201.
[8] Hu Jin et al. "Soft and smart modular structures actuated by shape memory alloy (SMA) wires as tentacles of soft robots." In: Smart Materials and Structures 25.8 (2016), p. 085026.
[9] Manfred Kohl. Shape memory microactuators. Springer Science Business Media, 2004.

What is claimed is:

1. A multi-armed robotic translation device, comprising:
a robotic body including a base section and a cover section attached to the base section;
a plurality of tentacles attached to the robotic body, the plurality of tentacles configured to apply a shear force on a target object to grip the target object using an adhesive force, each tentacle comprising a skeleton including a plurality of memory alloy wires configured to move the tentacle and a polymer skin; and
a control system positioned in the robotic body configured to provide power and/or control signals to the tentacles.

2. The multi-armed robotic translation device of claim 1, wherein the robotic body includes sensors embedded therein for close-in observation of another platform or body that the robotic body is attached to.

3. The multi-armed robotic translation device of claim 1, wherein the target object is a satellite or other space body.

4. The multi-armed robotic translation device of claim 1, wherein the robotic body is configured to be connected to the target object.

5. The multi-armed robotic translation device of claim 1, wherein the control system is configured to provide a current to each shape memory alloy wire in the plurality of memory alloy wires for a tentacle selected from the plurality of tentacles for actuation.

6. The multi-armed robotic translation device of claim 1, wherein the plurality of memory alloy wires is attached to a spring with each shape memory alloy wire being attached to a plurality of windings in the spring at an interior position.

7. The multi-armed robotic translation device of claim 1, wherein the robotic body includes a power supply system and a communication system.

8. The multi-armed robotic translation device of claim 1, wherein the control system is configured to distribute a control signal to each tentacle of the plurality of tentacles.

9. The multi-armed robotic translation device of claim 1, wherein an elastomeric flexible material surrounds each tentacle of the plurality of tentacles, the elastomeric flexible material allowing for conformability to a surface contacted by the plurality of tentacles and able to operate over any surface geometry contacted by the plurality of tentacles.

10. The multi-armed robotic translation device of claim 1, wherein each tentacle includes at least one adhesion tile positioned on each tentacle of the plurality of tentacles and configured to apply the shear force on the target object to grip the target object using the adhesive force.

11. The multi-armed robotic translation device of claim 1, wherein each tentacle includes an electro-adhesion tile and a gecko adhesive tile at an end of the tentacles.

12. The multi-armed robotic translation device, of claim 1, wherein the plurality of tentacles are configured to grip the target object.

13. The multi-armed robotic translation device of claim 1, further comprising an embedded sensor configured to detect an electrical anomaly or thermal anomaly.

14. The multi-armed robotic translation device of claim 13, further comprising:

a second sensor positioned on each of a plurality of adhesion tiles and configured to detect an adhesive contact of each adhesion tile and shear forces on the target object.

15. The multi-armed robotic translation device of claim 14, wherein the control system includes multiple controllers.

16. A robotic translation device comprising:

a robotic body that hosts a central sensor of any type of light wavelength measuring or sensing system, the robotic body having a base section and a top section attached to the base section;

one or more tentacles coupled to the base section of the robotic body and configured to provide constant grip and translation to a space object, each tentacle including a skeleton including a plurality of memory alloy wires configured to move the tentacle and a polymer skin;

one or more tiles positioned on each tentacle of the one or more tentacles and configured to apply a shear force on the space object to grip the space object using an adhesive; and a distributed processing system whereby each tentacle has an associated controller, wherein the distributed processing system is configured to move or position the one or more tentacles based on shear forces on the space object.

17. The robotic translation device of claim 16, further comprising:

a memory;

a wired or wireless communication device; and a power supply system configured to provide power to move or position the one or more tentacles to keep the robotic body and tentacles attached to the space object.

18. The robotic translation device of claim 16, wherein the one or more tiles are configured to control or adjust an amount of the shear force applied by each of the one or more tiles and each of the one or more tentacles without losing the grip of the space object, wherein the one or more tiles are configured to be turned on or turned off to make contact to grab the space object.

19. The robotic translation device of claim 16, wherein an individual processor on each tentacle is configured to control shear forces on the space object for grip and for locomotion of the robotic translation device.

20. A multi-armed robotic translation device, comprising:

a robotic body including a base section and a cover section attached to the base section;

a plurality of tentacles attached to the robotic body, the plurality of tentacles configured to apply a shear force on a target object to grip the target object using an adhesive force, each tentacle includes a skeleton including a plurality of memory alloy wires configured to move the tentacle and a polymer skin, wherein each shape memory alloy wire is attached to a spring at an interior position; and a control system positioned in the robotic body configured to provide power and/or control signals to the tentacles.

\* \* \* \* \*